United States Patent
Liu et al.

(10) Patent No.: US 12,098,253 B2
(45) Date of Patent: Sep. 24, 2024

(54) METHOD FOR PREPARING THERMOPLASTIC STARCH BY IN-SITU REACTIVE EXTRUSION PLASTICIZATION PROCESS AND METHOD FOR PREPARING STARCH/POLYMER BLEND BY IN-SITU REACTIVE EXTRUSION PLASTICIZATION AND COMPATIBILIZATION PROCESS

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Yang Xiang, Taiyuan (CN); Guizhe Zhao, Taiyuan (CN)

(73) Assignees: NORTH UNIVERSITY OF CHINA, Taiyuan (CN); SHANXI ZHONGBEI NEW MATERIAL TECHNOLOGY CO., LTD., Taiyuan (CN)

( * ) Notice: Subject to any disclaimer, the term of this patent is extended or adjusted under 35 U.S.C. 154(b) by 127 days.

(21) Appl. No.: 17/831,092

(22) Filed: Jun. 2, 2022

(65) Prior Publication Data
US 2022/0298308 A1    Sep. 22, 2022

(30) Foreign Application Priority Data
Jan. 22, 2022    (CN) .......................... 202210075163.0

(51) Int. Cl.
*C08J 3/18*    (2006.01)
*C08J 3/00*    (2006.01)

(52) U.S. Cl.
CPC ................. *C08J 3/18* (2013.01); *C08J 3/005* (2013.01); *C08J 2303/02* (2013.01); *C08J 2467/02* (2013.01); *C08J 2467/04* (2013.01)

(58) Field of Classification Search
CPC . C08J 3/18; C08J 3/005; C08J 2303/02; C08J 2467/02; C08J 2467/04
See application file for complete search history.

(56) References Cited

U.S. PATENT DOCUMENTS

| 6,500,371 | B1 * | 12/2002 | Berbner ................. B29B 7/007 264/204 |
| 8,809,424 | B2 * | 8/2014 | Feron ......................... C08L 3/02 524/47 |
| 10,906,843 | B2 * | 2/2021 | Zhao ......................... C05C 9/02 |
| 2014/0235763 | A1 * | 8/2014 | Villada Castillo .... B29C 48/865 264/177.19 |

FOREIGN PATENT DOCUMENTS

| CN | 1931905 | A |   | 3/2007 |   |
| CN | 101864133 | A | * | 10/2010 | ............. C08L 29/04 |
| CN | 104109262 | A | * | 10/2014 |   |
| CN | 106239767 | A |   | 12/2016 |   |
| CN | 106366355 | A |   | 2/2017 |   |

OTHER PUBLICATIONS

Clarivate Analytics machine translation of CN 101864133 A to Yang et al. published Oct. 20, 2010 (Year: 2010).*
Machine translation of CN 104109262 A, published Oct. 22, 2014. (Year: 2014).*

* cited by examiner

*Primary Examiner* — Jane L Stanley

(57) ABSTRACT

A method of producing a thermoplastic starch by an in-situ reactive extrusion plasticization process and a method for preparing a starch/polymer blend by an in-situ reactive extrusion plasticization and compatibilization process. In the method, a plasticizer reaction precursor (or a plasticizing compatibilizer reaction precursor) is mixed with starch to adhere to the surface of the starch or enter the starch to break the intermolecular and intramolecular hydrogen bonds of the starch. Then a mixture of the plasticizer reaction precursor (or the plasticizing compatibilizer reaction precursor) and starch is subjected to extrusion to produce the thermoplastic starch (or the starch/polymer blend), where the reaction precursor undergoes an in-situ reaction on the surfaces of the starch and in the starch to form a macro-molecular plasticizer (or a plasticizing compatibilizer) to plasticize starch or provide plasticizing and compatibilizing effect on the starch/polymer blend.

4 Claims, 5 Drawing Sheets

METHOD FOR PREPARING THERMOPLASTIC STARCH BY IN-SITU REACTIVE EXTRUSION PLASTICIZATION PROCESS AND METHOD FOR PREPARING STARCH/POLYMER BLEND BY IN-SITU REACTIVE EXTRUSION PLASTICIZATION AND COMPATIBILIZATION PROCESS

CROSS-REFERENCE TO RELATED APPLICATIONS

This application claims the benefit of priority from Chinese Patent Application No. 202210075163.0, filed on Jan. 22, 2022. The content of the aforementioned application, including any intervening amendments thereto, is incorporated herein by reference.

TECHNICAL FIELD

The present application relates to the preparation of thermoplastic starch and starch/polymer blends, and more particularly to a method for preparing a thermoplastic starch by an in-situ reactive extrusion plasticization process and a method for preparing a starch/polymer blend by an in-situ reactive extrusion plasticization and compatibilization process.

BACKGROUND

Inedible starch has undergone remarkable development over the past few decades, thereby leading to an increasingly growing attention with respect to the replacement of traditional plastics (i.e., polyethylene, polystyrene) with biodegradable materials such as starch. Similar to other polymers, starch can also be processed into a wide variety of products by using conventional polymer processing techniques such as melt extrusion, molding, hot pressing and blow molding. Currently, thermoplastic derivatives of starch (i.e., thermoplastic starch (TPS)) have been reported as an ideal alternative to synthetic polymers for conventional packaging.

In the presence of water or other plasticizers, by applying thermal energy and mechanical energy, the intermolecular and intramolecular hydrogen bonds of starch could be broken, and the crystalline structure in the native starch granules is disintegrated by melting and shearing to form a disordered-continuous phase, thereby obtaining a material having thermoplastic behavior, that is, TPS. The development and production of biodegradable TPS are significant for reducing the total amount of synthetic plastic waste.

A physical or chemical blending of a variety of polymers to improve the performance of original polymers or to form polymers with desired properties has always attracted considerable attention in the field of polymer science. Unfortunately, components in the blending system are often incompatible, so the polymer blending system obtained by the conventional mixing technique may be inferior to individual components in performance. The incompatibility causes a large interfacial force between individual components in the molten state, which will result in the uneven dispersion of individual components during mixing and the formation of defects between phases, thereby attenuating performance of the polymer blend. Therefore, the mechanical performance of the polymer blend is highly dependent on the compatibility and the force between the two-phase interfaces.

Generally, the force between interfaces can be enhanced through compatibilization, such as the addition of compatibilizers. The compatibilizers are divided into non-reactive compatibilizer and reactive compatibilizer according to whether they react with the polymers in the blend. The reactive compatibilizer refers to a compatibilizer that reacts with a certain blend component to offer a compatibilization effect, and it has a small dosage and low cost, but may produce side reactions, causing a decline in the performance of the blend. Moreover, the reactive compatibilizer often requires harsh mixing and molding conditions. With regard to the non-reactive compatibilizer, it serves as a surfactant to allow the formed blend to be dispersed into microphases to enable the compatibilization. The non-reactive compatibilizer with low molecular weight is prone to quickly diffusing to the interface, but cannot provide a stable phase state; while the non-reactive compatibilizer with relatively high molecular weight is not easy to diffuse to the interface, but can provide a stable phase state, and has a low critical micelle concentration.

There are a wide variety of available petroleum-based plastics, such as polyethylene, polypropylene, polystyrene, polyvinyl chloride, polyethylene terephthalate and polyurethane. Due to the characteristics of large molecular weight, high hydrophobicity, and strong chemical bond energy, these synthetic plastics are often non-biodegradable, and will exist for a long time, causing serious damage to the ecology. At present, "white pollution" has become a serious global problem. Therefore, considerable effort has been devoted to the research and development of biodegradable polymers such as polylactic acid (PLA), polyhydroxyalkanoate (PHA), polyhydroxybutyrate (PHB), poly ε-caprolactone (PCL), polybutylene succinate (PBS) and poly (butyleneadipate-co-terephthalate) (PBAT). Whereas, those ester-carrying biodegradable polymers struggle with low biodegradation rate and high cost, and usually need to be blended with other degradable materials.

Starch has become the most commonly used material for the blending of biodegradable polymers due to its good biodegradability and renewability, wide source, and low cost. However, the presence of a large number of hydrogen bond interactions renders starch poor in machinability. At present, urea and glycerol are mostly used for the plasticization of starch or the plasticization and compatibilization of starch/polymer blends. Glycerol can better break the intermolecular hydrogen bonds of starch, thereby improving the processing performance of starch or blends thereof. However, glycerol is a small-molecule plasticizer and is prone to migration, which will deteriorate the performance of the as-prepared thermoplastic starch or starch/polymer blend. The urea molecule can enter the starch granules to significantly destroy the intramolecular and intermolecular hydrogen bonds, improving the processing performance of the starch. Nevertheless, due to the destruction of a large number of starch particles, the mechanical properties of the as-prepared thermoplastic starch or starch/polymer blend are generally low. Therefore, it is urgently needed to develop an efficient plasticizing technique for preparing a thermoplastic starch suitable for blow molding, extrusion and other forming processes or an efficient plasticizing and compatibilizing process for preparing a starch/polymer blend.

Reactive extrusion is performed by using a screw extruder as a continuous reaction space for monomer polymerizations or chemical reactions between polymers and additive materials, aiming to achieve the polymer modification or the compatibilization of the incompatible blending system. It is a continuous process integrating polymer synthesis, chemical reaction, and extrusion forming. The reactive extrusion technology has many advantages, such as various mixing forms, easy cleaning, high product quality, high production efficiency, high automation and strong controllability, good operation environment, low cost, and high profit, and is suitable for large-scale production, and thus has become a research hotspot worldwide.

SUMMARY

An object of this disclosure is to provide a method for producing a thermoplastic starch by an in-situ reactive extrusion plasticization process and a method for preparing a starch/polymer blend by an in-situ reactive extrusion plasticization and compatibilization process to overcome the defects in the prior art.

The technical solutions of this application are described as follows.

In a first aspect, this application provides a method for preparing a thermoplastic starch by an in-situ reactive extrusion plasticization process, comprising:

(S1) mixing a plasticizer reaction precursor with starch to allow the plasticizer reaction precursor to adhere to a surface of starch granules or to enter into the starch granules to break interchain and intrachain hydrogen bonds of the starch; and (S2) subjecting a mixture of the plasticizer reaction precursor and the starch to extrusion in a screw extruder to produce the thermoplastic starch; wherein during the extrusion, the plasticizer reaction precursor undergoes an in-situ reaction on the surface of the starch granules and inside the starch granules to form a macro-molecular plasticizer; and an active group on a macro-molecular chain of the plasticizer is capable of interacting with an active functional group on a macro-molecular chain of the starch such that a starch-starch interaction is replaced by a starch-plasticizer interaction, accompanied by partial depolymerization of a backbone of the starch and reduction of a melting temperature of the starch to be lower than a decomposition temperature of the starch.

In an embodiment, the plasticizer reaction precursor is hydroxymethylolurea, and the plasticizer is a urea-formaldehyde.

In an embodiment, the method further comprising:

mixing formaldehyde and urea followed by pH adjustment and a reaction to produce a hydroxymethylurea solution;

wherein in step (S2), the starch and the hydroxymethylurea solution are mixed, kneaded in a kneader until there is no aggregation of the starch granules, and then transferred to the screw extruder for extrusion to obtain the thermoplastic starch, and the screw extruder is a double-screw extruder.

In an embodiment, the extrusion is performed at 90-130° C.

In a second aspect, this application provides a method for a starch/polymer blend by an in-situ reactive extrusion plasticization and compatibilization process, comprising:

(S1) mixing a plasticizing compatibilizer reaction precursor with starch to allow the plasticizing compatibilizer reaction precursor to adhere to a surface of starch granules or enter into the starch granules to break interchain and intrachain hydrogen bonds of the starch; and (S2) subjecting a mixture of the plasticizing compatibilizer reaction precursor and the starch, and a polymer to extrusion in a screw extruder to produce the starch/polymer blend; wherein during the extrusion, the plasticizing compatibilizer reaction precursor undergoes an in-situ reaction on the surface of the starch granules and inside the starch granules to form a plasticizing compatibilizer; and an active group on a macro-molecular chain of the plasticizing compatibilizer is capable of interacting with an active functional group on a macro-molecular chain of the starch or the polymer in a blending system to improve interfacial compatibility between individual components of the starch/polymer blend.

In an embodiment, the plasticizing compatibilizer reaction precursor is hydroxymethylurea, and the plasticizing compatibilizer is urea-formaldehyde.

In an embodiment, the polymer is a biodegradable polymer containing the active functional group; the active functional group is capable of forming a strong hydrogen bond with the plasticizing compatibilizer.

In an embodiment, the method further comprising:

mixing formaldehyde and urea followed by pH adjustment and reaction to produce a hydroxymethylurea solution;

wherein the step (S2) is performed through steps of:

uniformly mixing the starch and the hydroxymethylurea solution followed by drying to obtain a hydroxymethylurea-plasticized starch;

uniformly mixing the hydroxymethylurea-plasticized starch, a polymer, a chain extender, and an inorganic filler to obtain a reaction mixture; and then feeding the reaction mixture to the screw extruder, followed by extrusion and granulation to obtain the starch/polymer blend, wherein the screw extruder is a double-screw extruder.

In an embodiment, the extrusion is performed at 110-180° C.

In an embodiment, the reaction mixture is prepared from A parts by weight of the polymer, B parts by weight of the starch, C parts by weight of the hydroxymethylurea solution, 0.5-1 parts by weight of the chain extender and 5-10 parts by weight of the inorganic filler, wherein $60 \leq A < 100$, $0 < B \leq 40$ and $0 < C \leq 15$.

The hydroxymethylurea undergoes an in-situ polycondensation to form urea-formaldehyde on the surfaces of the starch granules and inside the starch granules, as shown in the following reaction scheme:

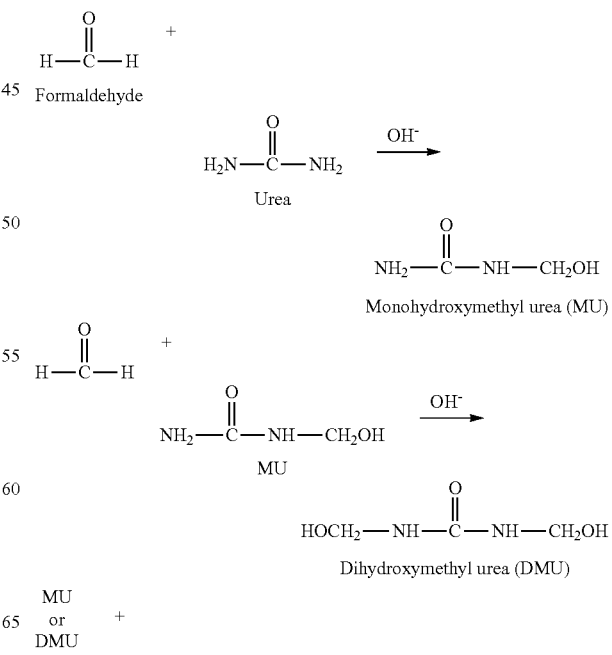

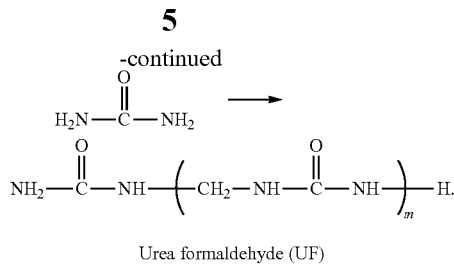

Urea formaldehyde (UF)

Compared with the prior art, this application has the following beneficial effects.

(1) In the method for producing a thermoplastic starch by an in-situ reactive extrusion process, the plasticizer reaction precursor is used as a raw material. Before extrusion, the plasticizer reaction precursor is mixed with starch. Since the plasticizer reaction precursor is small-molecular, the plasticizer reaction precursor is prone to adhere to a surface of starch granules or enter into the starch to break interchain and intrachain hydrogen bonds of the starch, thereby improving the mechanical processing performance of the starch. During extrusion by using a screw extruder, the plasticizer reaction precursor undergoes an in-situ reaction on the surface of starch granules and inside the starch to form a macro-molecular plasticizer. The active group on the macro-molecular chain of the plasticizer can interact with the active functional group on the macro-molecular chain of the starch such that the starch-starch interaction is replaced by a starch-plasticizer interaction, accompanied by partial depolymerization of the backbone of the starch, and the reduction of the melting temperature of the starch to be lower than the decomposition temperature of the starch. As a result, the method provided herein can solve the problem of easy migration of small-molecular plasticizers (for example glycerol) and the low mechanical properties of the as-prepared thermoplastic starch using urea as the plasticizer. In addition, the preparation process is simple, low cost and easy to be used for large-scale industrial production.

(2) In the method for preparing a starch/polymer blend by an in-situ reactive extrusion plasticization and compatibilization process, a small dosage of the reactive-type plasticizer is used, which is low-cost, and can overcome defects (i.e., reduced performance of the blend, high-required conditions of mixing and molding) caused by side reactions. Moreover, before extrusion, the plasticizer reaction precursor with low molecular weight is prone to quickly diffuse to the interface of individual components, and after an in-situ reaction occurs at the interface during extrusion, the obtained plasticizer with high molecular weight can offer a stable phase, that is, it solves the problem of the presence of non-reactive-type compatibilizing agent. In particular, the method provided herein enables the dual effects of plasticization and compatibilization in one step, through which the mechanical properties of the as-prepared starch/polymer blend are excellent.

(3) The introduction of starch and organic filler can effectively reduce material costs. In addition, the in-situ reactive extrusion process provided herein is simple and economic, and thus suitable for large-scale industrial production. Thus, the present application is of great significance for the widespread use of starch/polymer blends.

BRIEF DESCRIPTION OF THE DRAWINGS

To render technical solutions of the embodiments of the present disclosure or in the prior art clearer, the drawings required in the embodiments of the present application or the prior art will be briefly described below. Obviously, illustrated in the drawings are only some embodiments of the present application, which are not intended to limit the disclosure. For one of ordinary skill in the art, other drawings can be obtained based on those drawings without paying creative efforts.

DETAILED DESCRIPTION OF EMBODIMENTS

Figure 1:
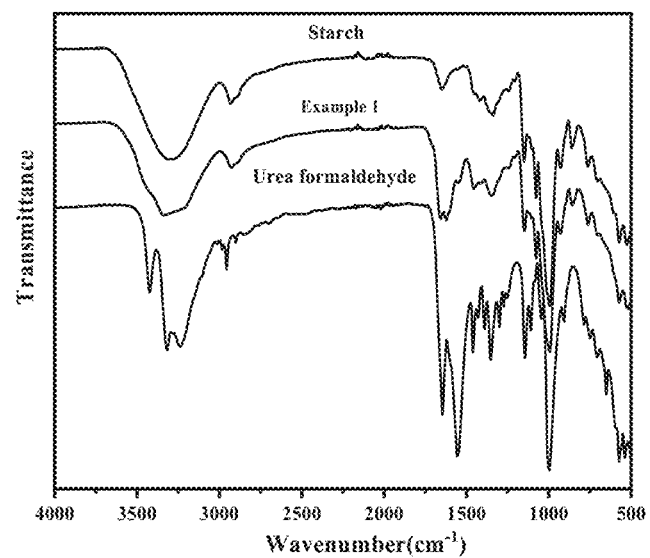
FIG. 1 is an infrared spectrum of thermoplastic starch, starch and urea-formaldehyde according to Example 1 of the present disclosure.

The technical solutions of the present application will be clearly and completely described below with reference to the drawings and embodiments. Obviously, described below are only some embodiments of the present application. Based on the embodiments provided herein, other embodiments obtained by those skilled in the art without paying any creative effort shall fall within the scope of this application.

Provided herein is a method for preparing a thermoplastic starch by an in-situ reactive extrusion plasticization process, which is described below. Before extrusion, a plasticizer reaction precursor is mixed with starch. Since the plasticizer reaction precursor is small-molecular, the plasticizer reaction precursor is prone to adhere to surfaces of starch granules or enter into the starch granules to break interchain and intrachain hydrogen bonds of the starch, thereby improving the mechanical processing performance of the starch. During extrusion by using a screw extruder, the plasticizer reaction precursor undergoes an in-situ reaction on the surface of starch granules and inside the starch granules to form a macro-molecular plasticizer. The active group on the chain of the macro-molecular plasticizer can interact with the active functional group on the macro-molecular chains of the starch such that the starch-starch interaction is replaced by a starch-plasticizer interaction, accompanied by partial depolymerization of the backbone of the starch, and the reduction of the melting temperature of the starch to be lower than the decomposition temperature of the starch.

This application also provides a method for preparing a starch/polymer blend by an in-situ reactive extrusion plasticization and compatibilization process, which is described below. Before extrusion, a plasticizing compatibilizer reaction precursor is mixed with starch and a polymer. Since the plasticizing compatibilizer reaction precursor is small-molecular, the plasticizing compatibilizer reaction precursor is prone to adhere to the surface of the starch granules or enter into the starch granules to break interchain and intrachain hydrogen bonds of the starch, thereby improving the mechanical processing performance of the starch. During extrusion by using a screw extruder, the plasticizing compatibilizer reaction precursor undergoes an in-situ reaction on the surface of the starch granules and inside the starch to form a macro-molecular plasticizing compatibilizer. The active group on the chain of the macro-molecular plasticizing compatibilizer can interact with the active functional group on the macro-molecular chains of the starch or the polymer in a starch/polymer blend to improve compatibility between interfaces of individual components of the starch-polymer blend.

In an embodiment, the plasticizer reaction precursor or the plasticizing compatibilizer reaction precursor is hydroxymethylurea, and the plasticizer or the plasticizing compatibilizer is urea-formaldehyde. It should be noted that the plasticizer or the plasticizing compatibilizer is not limited to the urea-formaldehyde, a macro-molecular plasticizer or plasticizing compatibilizer capable of being extruded by the precursor through an in-situ reaction is likewise suitable for the method provided herein.

In an embodiment, the method for preparing thermoplastic starch by an in-situ reactive extrusion process includes the following steps.

(S1) Formaldehyde and urea are mixed to form a reaction system; and pH of the reaction system is adjusted, followed by a reaction to obtain a hydroxymethylurea solution.

(S2) Starch and the hydroxymethylurea solution are mixed, fed to a kneader to be kneaded until there is no aggregation of the starch, and transferred to a double-screw extruder to undergo extrusion to obtain a thermoplastic starch.

In an embodiment, in step (S1), a molar ratio of the formaldehyde to the urea is 1:1-5; the pH of the reaction system is 9; and the extrusion is performed at 30-80° C. for 0.5-6 h.

In an embodiment, in step (S2), the starch is 70-80 parts in weight, and the hydroxymethylurea solution is 20-30 parts in weight; and the extrusion is performed at 90-130° C. and a rotating speed of 20-400 RPM.

In an embodiment, the method for preparing a starch/polymer blend by an in-situ reactive extrusion plasticization and compatibilization process includes the following steps.

(S1) Formaldehyde and urea are mixed to form a reaction system; and pH of the reaction system is adjusted, followed by a reaction to obtain a hydroxymethylurea solution.

(S2) Starch and the hydroxymethylurea solution are mixed uniformly, followed by drying to constant weight to obtain a hydroxymethylurea-plasticized starch.

(S3) The hydroxymethylurea-plasticized starch, a polymer, a chain extender, and an inorganic filler are mixed uniformly to obtain a reaction mixture, and then the reaction mixture is fed to a double-screw extruder to undergo extrusion granulation to obtain a starch/polymer blend that is plasticized and compatibilized by the urea-formaldehyde produced by reactive extrusion of hydroxymethylurea.

In an embodiment, in step (S1), a molar ratio of the formaldehyde to the urea is 1:1-5; the pH of the reaction system is 9; and the reaction is performed at 30-80° C. for 0.5-6 h.

In an embodiment, in step (S2), the drying is performed at 60° C. It should be noted that the drying temperature is not limited, and any temperature that does not affect the properties of hydroxymethylurea-plasticized starch can be adopted.

In an embodiment, in step (S3), the reaction mixture is prepared from A parts by weight of the polymer, B parts by weight of the starch, C parts by weight of the hydroxymethylurea solution, 0.5-1 part by weight of the chain extender and 5-10 parts by weight of the inorganic filler, wherein $60 \leq A < 100$, $0 < B \leq 40$ and $0 < C \leq 15$.

In an embodiment, in step (S3), the polymer is selected from poly lactic acid (PLA) or Poly (butyleneadipate-co-terephthalate) (PBAT); the starch is selected from tapioca starch, maize starch, or potato starch; the chain extender is chain extender X-U993 or chain extender CE1105; the inorganic filler is anyone of the low-cost inorganic fillers; and the extrusion is performed at 110-180° C. with a rotating speed of a screw rod of the double-screw extruder of 20-400 RPM.

The technical solutions of the present disclosure will be described in detail below with reference to embodiments.

Example 1

Provided herein was a method for preparing a thermoplastic starch by an in-situ reactive extrusion process, which included the following steps.

(S1) 40.5 g of formaldehyde and 36 g of urea were mixed, adjusted to pH 9 and reacted at 40° C. for 2 h to obtain a hydroxymethylurea solution.

(S2) 80 g of starch and 20 g of the hydroxymethylurea solution were mixed, kneaded by a kneader until there was no aggregation of the starch granules, and transferred to a double-screw extruder to undergo extrusion and granulation to obtain a thermoplastic starch, where zones of the double-screw extruder were set to 90, 90, 100, and 100° C. successively, and a rotating speed of the double-screw extruder was 50 RPM.

Example 2

Provided herein was a method for preparing a thermoplastic starch by an in-situ reactive extrusion process, which included the following steps.

(S1) 40.5 g of formaldehyde and 42 g of urea were mixed, adjusted to pH 9 and reacted at 40° C. for 2 h to obtain a hydroxymethylurea solution.

(S2) 80 g of starch and 20 g of the hydroxymethylurea solution were mixed, kneaded by a kneader until there was no aggregation of the starch granules, and transferred to a double-screw extruder to undergo extrusion and granulation to obtain a thermoplastic starch, where zones of the double-screw extruder were set as 90, 90, 100, and 100° C. successively, and a rotating speed of the double-screw extruder was 50 RPM.

Example 3

Provided herein was a method for preparing a thermoplastic starch by an in-situ reactive extrusion process, which included the following steps.

(S1) 40.5 g of formaldehyde and 48 g of urea were mixed, adjusted to pH 9 and reacted at 40° C. for 2 h to obtain a hydroxymethylurea solution.

(S2) 80 g of starch and 20 g of the hydroxymethylurea solution were mixed, kneaded by a kneader until there was no aggregation of the starch granules, and transferred to a double-screw extruder to undergo extrusion and granulation to obtain a thermoplastic starch, where zones of the double-screw extruder were set as 90, 90, 100, and 100° C. successively, and a rotating speed of the double-screw extruder was 50 RPM.

Example 4

Provided was a method for preparing a thermoplastic starch by an in-situ reactive extrusion process, which included the following steps.

(S1) 40.5 g of formaldehyde and 54 g of urea were mixed, adjusted to pH 9 and reacted at 40° C. for 2 h to obtain a hydroxymethylurea solution.

(S2) 80 g of starch and 20 g of the hydroxymethylurea solution were mixed, kneaded by a kneader until there was no aggregation of the starch, and transferred to a double-screw extruder to undergo extrusion and granulation to obtain a thermoplastic starch, where zones of the double-screw extruder were set as 90, 90, 100, and 100° C. successively, and the rotating speed of the double-screw extruder was 50 RPM.

Example 5

Provided herein was a method for preparing a thermoplastic starch by an in-situ reactive extrusion process, which included the following steps.

(S1) 40.5 g of formaldehyde and 60 g of urea were mixed, adjusted to pH 9 and reacted at 40° C. for 2 h to obtain a hydroxymethylurea solution.

(S2) 80 g of starch and 20 g of the hydroxymethylurea solution were mixed, kneaded by a kneader until there was no aggregation of the starch granules, and transferred to a double-screw extruder to undergo extrusion and granulation to obtain a thermoplastic starch, where zones of the double-screw extruder were set as 90, 90, 100, and 100° C. successively, and a rotating speed of the double-screw extruder was 50 RPM.

Example 6

Provided herein was a method for preparing a thermoplastic starch by an in-situ reactive extrusion process, which included the following steps.

(S1) 40.5 g of formaldehyde and 36 g of urea were mixed, adjusted to pH 9 and reacted at 40° C. for 2 h to obtain a hydroxymethylurea solution.

(S2) 70 g of starch and 30 g of the hydroxymethylurea solution were mixed, kneaded by a kneader until there was no aggregation of the starch, and transferred to a double-screw extruder to undergo extrusion and granulation to obtain a thermoplastic starch, where zones of the double-screw extruder were set as 90, 90, 100, and 100° C. successively, and a rotating speed of the double-screw extruder was 50 RPM.

Examples 7-9

Provided was a method for preparing a starch/PLA blend by an in-situ reactive extrusion plasticization and compatibilization process, which included the following steps.

(S1) 40.5 g of formaldehyde and 36 g of urea were mixed, adjusted to pH 9 and reacted at 50° C. for 2 h to obtain a hydroxymethylurea solution, where the molar ratio of the formaldehyde to the urea was 1:1.2.

(S2) Starch and the hydroxymethylurea solution were mixed, kneaded by a kneader until there was no aggregation of the starch granules, and dried at 60° C. to a constant weight to obtain a plasticized starch.

(S3) The plasticized starch, poly lactic acid (PLA), a chain extender CE1105, 2000-mesh industrial-grade talcum powder were mixed by a high-speed mixer, and then transferred to a double-screw extruder to undergo extrusion and granulation to obtain a starch/PLA blend, where zones of the double-screw extruder were set as 160, 160, 170, and 170° C. successively, and a rotating speed of the double-screw extruder was 60 RPM.

In Example 7, the starch/PLA blend was prepared from 62 parts by weight of PLA, 26 parts by weight of the starch, 7 parts by weight of the hydroxymethylurea solution, 1 part by weight of the chain extender CE1105, and 4 parts by weight of the 2000-mesh industrial-grade talcum powder.

In Example 8, the starch/PLA blend was prepared from 60 parts by weight of PLA, 25 parts by weight of the starch, 10 parts by weight of the hydroxymethylurea solution, 1 part by weight of the chain extender CE1105, and 4 parts by weight of the 2000-mesh industrial-grade talcum powder.

In Example 9, the starch/PLA blend was prepared from 59 parts by weight of PLA, 24 parts by weight of the starch, 12 parts by weight of the hydroxymethylurea solution, 1 part by weight of the chain extender CE1105, and 4 parts by weight of the 2000-mesh industrial-grade talcum powder.

Examples 10-12

Provided was a method for preparing a starch/PBAT blend by an in-situ reactive extrusion plasticization and compatibilization process, which included the following steps.

(S1) 40.5 g of formaldehyde and 36 g of urea were mixed, adjusted to pH 9 and reacted at 50° C. for 2 h to obtain a hydroxymethylurea solution, where the molar ratio of the formaldehyde to the urea was 1:1.2.

(S2) Starch and the hydroxymethylurea solution were mixed, kneaded by a kneader until there was no aggregation of the starch granules, and dried at 60° C. to a constant weight to obtain a plasticized starch.

(S3) The plasticized starch, poly (butyleneadipate-co-terephthalate) (PBAT), a chain extender X-U993, 2000-mesh industrial-grade talcum powder were mixed by a high-speed mixer, and then transferred to a double-screw extruder to undergo extrusion and granulation and to obtain a starch/PBAT blend, where zones of the double-screw extruder were set as 130, 130, 140, and 140° C. successively, and a rotating speed of the double-screw extruder was 60 RPM.

In Example 10, the starch/PBAT blend was prepared from 65 parts by weight of PBAT, 10 parts by weight of the starch, 10 parts by weight of the hydroxymethylurea solution, 0.5 part by weight of the chain extender X-U993, and 10 parts by weight of the 2000-mesh industrial-grade talcum powder.

In Example 11, the starch/PBAT blend was prepared from 65 parts by weight of PBAT, 12 parts by weight of the starch, 8 parts by weight of the hydroxymethylurea solution, 0.5 part by weight of the chain extender X-U993, and 10 parts by weight of the 2000-mesh industrial-grade talcum powder.

In Example 12, the starch/PBAT blend was prepared from 65 parts by weight of PBAT, 14 parts by weight of the starch, 6 parts by weight of the hydroxymethylurea solution, 0.5 part by weight of the chain extender X-U993, and 10 parts by weight of the 2000-mesh industrial-grade talcum powder.

Comparative Example 1

Provided herein was a method for preparing a starch/PBAT blend, which included the following steps.

(S1) 70 g of starch and 30 g of glycerol solution were mixed, kneaded by a kneader until there was no aggregation of the starch granules, and then transferred to a double-screw extruder to undergo extrusion and granulation to obtain a thermoplastic starch, where zones of the double-screw extruder were set as 90, 90, 100, and 100° C. successively, and a rotating speed of the double-screw extruder was 50 RPM.

(S2) The thermoplastic starch, poly (butyleneadipate-co-terephthalate) (PBAT), a chain extender X-U993, 2000-mesh industrial-grade talcum powder were mixed by a high-speed mixer, and then transferred to a double-screw extruder to undergo extrusion and granulation to obtain a starch/PBAT blend, where the raw material composition and process parameters of Comparative Example 1 were basically the same as those of Example 12, except that in Comparative Example 1, the glycerol solution was used instead of the hydroxymethylurea solution in Example 12.

Comparative Example 2

Provided was a method for preparing a starch/PLA blend, in which the raw material composition and process parameters of Comparative Example 2 were basically the same as those of Example 7, except that the hydroxymethylurea solution was not used in Comparative Example 2.

The test standards of each experiment were recited below.

The mechanical properties of materials were tested according to the GB/T1040.1-2010 "Determination of tensile properties of plastics".

The rheological properties of materials were tested through the following steps. A torque rheometer was turned on. If the sample was a starch/PLA blend, the torque rheometer was set at 170° C. If the sample was a starch/PBAT blend, the torque rheometer was set at 140° C. After the torque rheometer was heated to the preset temperature, 50 g of the sample was fed to the torque rheometer to be tested until the torque of the sample was constant.

TABLE 1

Comparison of properties of starch/PLA blends prepared in Examples 7-12 and Comparative Examples 1-2

| Examples | Transverse tensile strength (MPa) | Transverse breaking elongation rate (%) | Longitudinal tensile strength (MPa) | Longitudinal breaking elongation rate (%) |
| --- | --- | --- | --- | --- |
| Example 7 | 12.7 | 176.4 | 17.6 | 210.4 |
| Example 8 | 13.1 | 180.5 | 18.1 | 207.5 |
| Example 9 | 13.8 | 184.4 | 18.7 | 202.8 |
| Example 10 | 7.9 | 288.1 | 12.2 | 255.2 |
| Example 11 | 6.4 | 287.1 | 11.6 | 264.7 |
| Example 12 | 6.3 | 283.4 | 10.8 | 277.0 |
| Comparative Example 1 | 3.5 | 30.9 | 6.3 | 173.6 |
| Comparative Example 2 | 4.1 | 5 | 4.4 | 4.7 |

As shown in Table 1, it could be seen from the comparison of Examples 7-9 and the Comparative Example 2 that with the increase of the content of urea-formaldehyde generated by an in-situ reactive extrusion process, the tensile strength of the prepared starch/polymer blend was gradually increased, and the starch/polymer blend had good comprehensive mechanical properties. In other words, the addition or increase of the urea-formaldehyde content can significantly improve the interfacial binding force between the components of the starch/PLA blend. Moreover, combined with the introduction of the chain extender and the inorganic filler (i.e., talcum powder), the tensile properties of the blending materials were significantly improved compared with pure polylactic acid.

As shown in Table 1, it could be seen from the comparison of Examples 10-12 and the Comparative Example 1 that with the increase of the content of urea-formaldehyde generated by an in-situ reactive extrusion or introduced by additive agents, the tensile strength and the breaking elongation rate of the prepared starch/polymer blend were gradually increased. Since the starch was rigid, by using the method provided herein, the starch granules could be uniformly dispersed in the PBAT substrate without damaging its structure. Therefore, the tensile properties of the blending materials were significantly improved.

It can be seen from FIG. 1, during extrusion in a screw extruder, the plasticizer reaction precursor undergoes an in-situ polymerization to prepare a urea-formaldehyde polymer.

Figure 2:
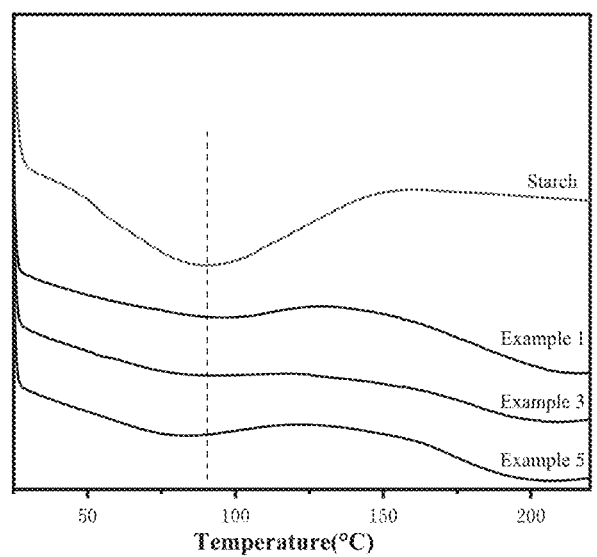
FIG. 2 is a differential scanning calorimetry (DSC) spectrum of thermoplastic starch products prepared under different urea-formaldehyde ratios.

As shown in FIG. 2, compared with starch, the starch crystal peak of the thermoplastic starch prepared in Example 1 does not show a significant shift, indicating that the plasticizing effect of the starch is not obvious. However, the starch crystal peaks of the thermoplastic starch prepared in Example 3 and Example 5 present a significant shift, indicating that the higher the urea and formaldehyde ratio, the more obvious the starch crystal peak of the prepared thermoplastic starch is a shift, that is, the more obvious the plasticization effect on the starch.

Figure 3:
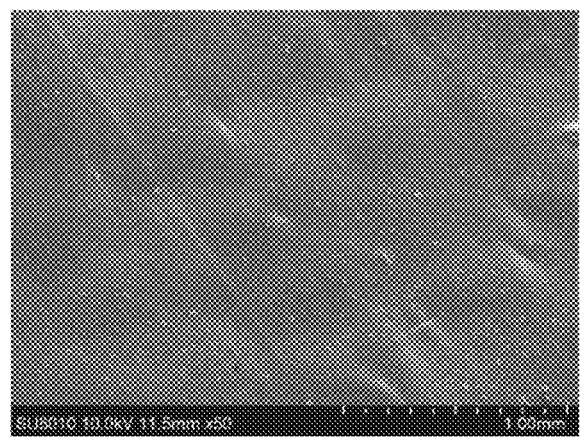
FIG. 3 is a scanning electron microscope (SEM) image of a starch/poly (butyleneadipate-co-terephthalate) (PBAT) blend according to Comparative Example 1 of the present disclosure.
Figure 4:
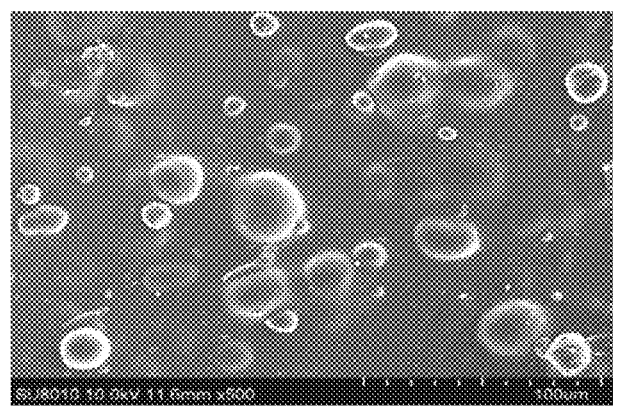
FIG. 4 is a SEM image of a starch/PBAT blend according to Example 12 of the present disclosure.

From the comparison of FIGS. 3 and 4, it can be seen that the spherical structure of the starch plasticized by glycerol in Comparative Example 1 is destroyed, and the compatibility between the plasticized starch and PBAT is poor. In the starch/PBAT blend prepared by the method provided herein, the spherical structure of the starch is not destroyed, and the compatibility between the starch and PBAT is significantly improved.

Figure 5A:
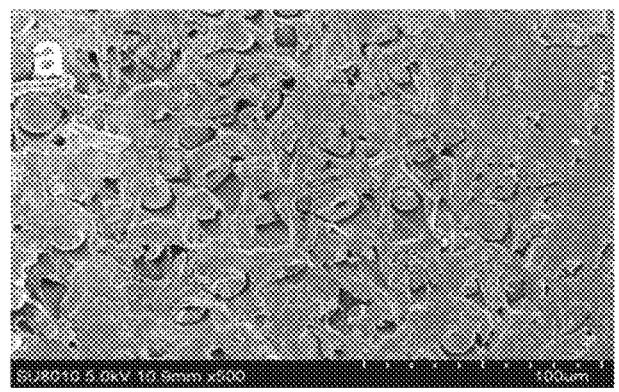
FIGS. 5a and 5b are SEM images of a starch/poly lactic acid (PLA) blend according to Comparative Example 2 of the present disclosure under different resolutions, where 5a: scale bar: 100 µm; and 5b: scale bar: 10.0 µm.
Figure 5B:
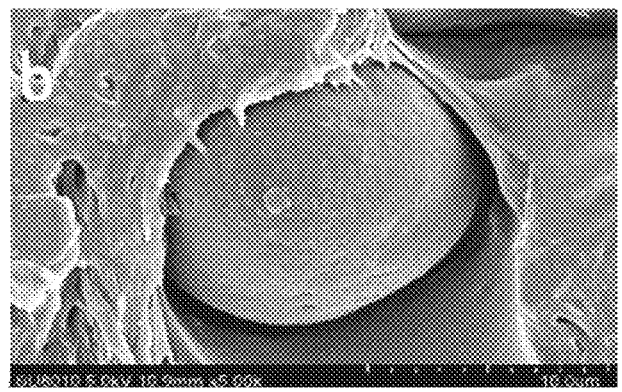
Figure 6A:
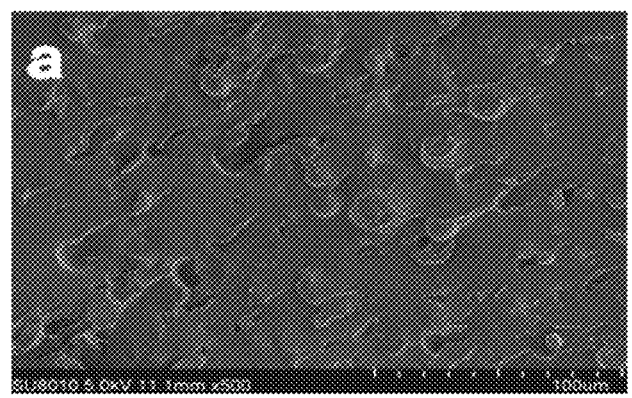
FIGS. 6a and 6b are SEM images of a starch/PLA blend according to Example 7 of the present disclosure under different resolutions, where 6a: scale bar: 100 µm; and 6b: scale bar: 10.0 µm.
Figure 6B:
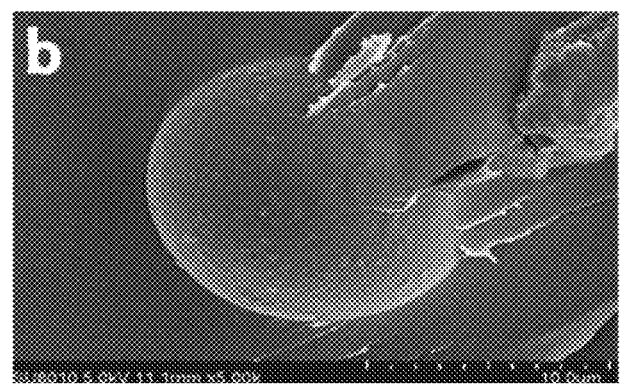

From the comparison of FIGS. 5 and 6, it can be seen that the compatibility between individual components of the starch/PLA blend in Comparative Example 2 is relatively poor, and there are large voids around the starch particles. In the starch/PLA blend prepared by the method provided herein, the starch particles are more completely retained in the blend material system and the compatibility between the interfaces of each component is significantly improved, proving that the plasticizing compatibilizer urea-formaldehyde generated by the in-situ reaction of the present disclosure has a compatibilization effect on the starch/PLA blend.

Figure 7A:
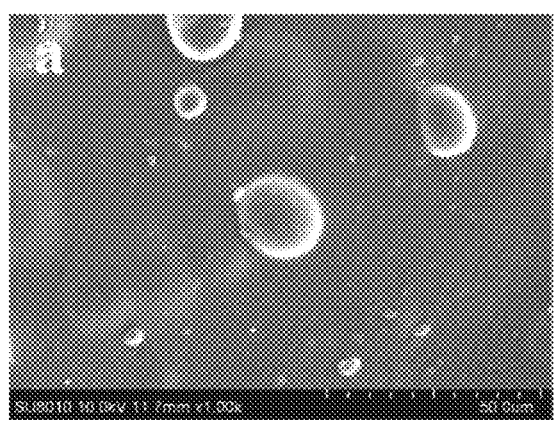
FIGS. 7a and 7b are SEM images of a starch/PBAT blend according to Example 9 of the present disclosure under different resolutions, where 7a: scale bar: 50 µm; and 7b: scale bar: 5.0 µm.
Figure 7B:
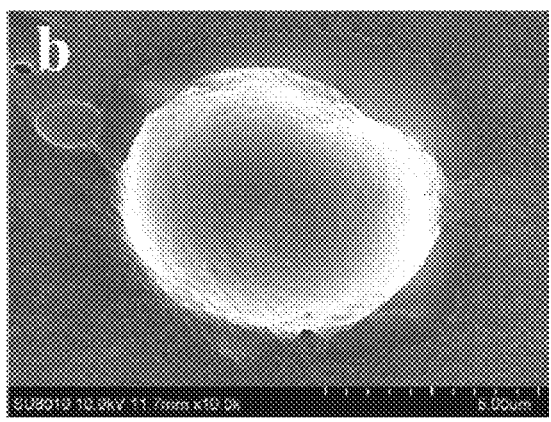

As can be seen from FIG. 7, in the starch/PBAT blend prepared by the method provided herein, the starch is uniformly dispersed in the PBAT matrix, and the spherical structure of the starch is maintained, proving that the mechanical properties of the starch/PBAT blend are greatly enhanced.

Figure 8:
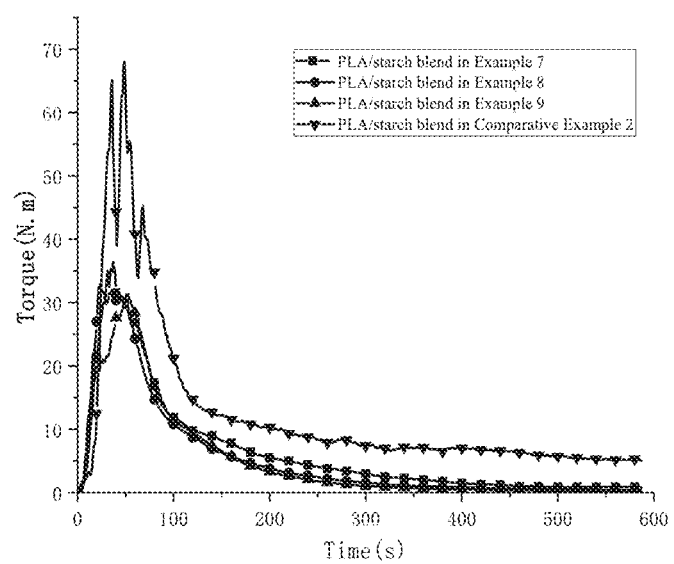
FIG. 8 shows effects of the raw material mixing ratio of the urea-formaldehyde on the rheological properties of the starch/PLA blend.

It can be seen from FIG. 8, by using the method provided herein, the torque of the starch/PLA blend is significantly reduced, thereby improving the poor rheological properties of the starch/PLA blend.

At last, it should be noted that described above are intended to explain the technical solutions of the present disclosure and are not intended to limit this application. Notwithstanding the present disclosure has been described in detail with reference to the foregoing embodiments, it should be understood by those skilled in the art that the described technical solutions can be modified or replaced with respect to some or all of the technical features. Those modifications or substitutions made without departing from the spirit and scope of the disclosure should fall within the scope of the disclosure defined by the appended claims.

What is claimed is:

1. A method for preparing a starch/polymer blend by an in-situ reactive extrusion plasticization and compatibilization process, the method comprising:
  a) mixing formaldehyde and urea for reaction to produce a hydroxymethylurea solution;
  b) uniformly mixing the hydroxymethylurea solution and starch followed by drying to produce a hydroxymethylurea-plasticized starch, wherein the hydroxymethylurea solution adheres to a surface of starch granules or enter into the starch granules to break interchain and intrachain hydrogen bonds of the starch;
  c) uniformly mixing the hydroxymethylurea-plasticized starch, a polymer, a chain extender and an inorganic filler to obtain a reaction mixture; and
  d) subjecting the reaction mixture to extrusion and granulation in a screw extruder to produce the starch/polymer blend, wherein during the extrusion, the hydroxymethylurea of the hydroxymethylurea-plasticized starch undergoes an in-situ reaction on the surface of the starch granules and inside the starch granules to form urea-formaldehyde, and an active group on a macromolecular chain of the urea-formaldehyde is capable of interacting with an active functional group on a macromolecular chain of the starch or the polymer;
  wherein the reaction mixture is prepared from A parts by weight of the polymer, B parts by weight of the starch, C parts by weight of the hydroxymethylurea solution, 0.5-1 part by weight of the chain extender and 5-10 parts by weight of the inorganic filler, wherein $60 \leq A < 100$, $0 < B \leq 40$ and $0 < C \leq 15$.

2. The method of claim 1, wherein the polymer is a biodegradable polymer containing the active functional group; and the active functional group is capable of forming a strong hydrogen bond with the urea-formaldehyde.

3. The method of claim 1, wherein the screw extruder is a double-screw extruder.

4. The method of claim 1, wherein in step d) the extrusion is performed at 110-180° C.

* * * * *